(12) United States Patent
Lawrence

(10) Patent No.: US 6,384,961 B2
(45) Date of Patent: *May 7, 2002

(54) COMPACT OPTICAL AMPLIFIER WITH INTEGRATED OPTICAL WAVEGUIDE AND PUMP SOURCE

(75) Inventor: Brian L. Lawrence, Watervliet, NY (US)

(73) Assignee: Molecular OptoElectronics Corporation, Watervliet, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/768,828

(22) Filed: Jan. 23, 2001

Related U.S. Application Data (63) Continuation of application No. 09/316,102, filed on May 24, 1999.

(51) Int. Cl.[7] .................................................. H01S 3/00
(52) U.S. Cl. ........................................ 359/333; 385/92
(58) Field of Search ................................. 359/333, 344; 385/92, 35

(56) References Cited

U.S. PATENT DOCUMENTS

| | | | |
|---|---|---|---|
| 3,590,004 A | 6/1971 | Woodcock | 252/301.4 |
| 3,826,992 A | 7/1974 | Friedl | 330/4.3 |
| 4,428,646 A | 1/1984 | Lighty | 350/96.31 |
| 4,515,431 A | 5/1985 | Shaw et al. | 350/96.15 |
| 4,603,940 A | 8/1986 | Shaw et al. | 350/96.15 |

(List continued on next page.)

FOREIGN PATENT DOCUMENTS

| | | | |
|---|---|---|---|
| EP | 0136047 A2 | 4/1985 | H01S/3/06 |
| EP | 0224070 A2 | 6/1987 | H01S/3/06 |
| EP | 0324541 A2 | 7/1989 | H01S/3/06 |
| EP | 0409258 A2 | 1/1991 | H01S/3/06 |
| EP | 0415167 A1 | 3/1991 | H01S/3/06 |

(List continued on next page.)

OTHER PUBLICATIONS

Baumgartner, Richard A. et al., "Optical Parametric Amplification," *IEEE Journal of Quantum Electronics*, vol. QE–15, No. 6, pp. 432–444 (Jun. 1979).

Becker, P.C. et al., "Erbium–Doped Fiber Amplifiers," *Academic Press*, Chapter 7. Fiber Amplifiers and Systems—Noise Theory, pp. 210–212 (1999).

Bortz, M. L. et al., "Increased Acceptance Bandwidth for Quasi–Phasematched Second Harmonic Generation in LiNbO$_3$ Waveguides," *IEEE*, 2 pages (Oct. 28, 1993).

Bradley, David, "Plastics That Play on Lights," *Science*, vol. 261, pp. 1272–1273, (Sep. 1993).

(List continued on next page.)

*Primary Examiner*—Mark Hellner
(74) *Attorney, Agent, or Firm*—Kevin P. Radigan, Esq.; Heslin Rothenberg Farley & Mesiti P.C.

(57) ABSTRACT

An optical amplifier with integrated optical waveguide, pump source and other, optional components for amplifying an input optical signal coupled from a fiber optic. The amplifier includes a housing having these components mounted therein, and appropriate optics for coupling the input and output optical signals to and from the appropriate ports, and for carrying an optical pump signal from its source to the waveguide. The optical waveguide disclosed is a channel waveguide amplification chip, having a relatively small size; and the pump source disclosed is a laser diode capable of generating the optical pump signal internal to the housing with only electrical (e.g., power) signals applied thereto from outside of the housing. Other optional components may be provided for cooperative optical processing in the amplifier housing. The disclosed optical amplifier offers size and cost advantages over other known systems.

53 Claims, 4 Drawing Sheets

U.S. PATENT DOCUMENTS

| | | | |
|---|---|---|---|
| 4,712,075 A | 12/1987 | Snitzer | 330/4.3 |
| 4,742,307 A | 5/1988 | Thylén | 330/4.3 |
| 4,867,518 A | 9/1989 | Stamnitz et al. | 350/96.15 |
| 4,895,422 A | 1/1990 | Rand et al. | 350/96.15 |
| 4,964,134 A | 10/1990 | Westbrook et al. | 372/45 |
| 4,995,696 A | 2/1991 | Nishimura et al. | 350/96.2 |
| 5,005,175 A | 4/1991 | Desurvire et al. | 372/6 |
| 5,037,181 A | 8/1991 | Byer et al. | 385/144 |
| 5,045,397 A | 9/1991 | Jensen | 428/429 |
| 5,064,265 A | 11/1991 | Khanarian et al. | 385/130 |
| 5,201,977 A | 4/1993 | Aoshima | 156/153 |
| 5,274,495 A | 12/1993 | Shirasaki | 359/330 |
| 5,349,600 A | 9/1994 | Shinbori et al. | 372/92 |
| 5,396,362 A | 3/1995 | Yakymyshyn et al. | 359/245 |
| 5,441,803 A | 8/1995 | Meissner | 428/220 |
| 5,479,542 A | 12/1995 | Krivoshlykov | 385/30 |
| 5,543,960 A | 8/1996 | Carrig et al. | 359/326 |
| 5,563,899 A | 10/1996 | Meissner et al. | 372/39 |
| 5,717,517 A | 2/1998 | Alfano et al. | 359/342 |
| 5,815,309 A | 9/1998 | Lawrence et al. | 359/333 |
| 5,846,638 A | 12/1998 | Meissner | 428/220 |
| 5,892,857 A | 4/1999 | McCallion | 385/1 |
| 6,052,220 A | 4/2000 | Lawrence et al. | 359/341 |
| 6,141,475 A | 10/2000 | Lawrence et al. | 385/123 |

FOREIGN PATENT DOCUMENTS

| | | | |
|---|---|---|---|
| EP | 0416301 A2 | 3/1991 | C30B/33/06 |
| EP | 0450603 A2 | 10/1991 | H01S/3/25 |
| EP | 0477898 A2 | 4/1992 | H01S/3/06 |
| EP | 0510883 A2 | 10/1992 | |
| EP | 0511069 A1 | 10/1992 | |
| JP | 61-228403 | 10/1986 | G02B/6/12 |
| JP | 62-069207 | 3/1987 | G02B/6/12 |
| JP | 02-001831 A | 1/1990 | |
| JP | 03-003283 | 1/1991 | H01S/3/06 |
| JP | 06-034829 | 2/1994 | |
| JP | 06-174955 | 6/1994 | G02B/6/12 |
| JP | 08-295524 A | 11/1996 | |
| JP | 08-316562 | 11/1996 | |
| WO | WO 00/20904 | 4/2000 | G02B/6/00 |

OTHER PUBLICATIONS

Chartier, I. et al., "Growth and Low–Threshold Laser Oscillation of an Expitaxially Grown Nd:YAG Waveguide," *Optic Letters*, vol. 17, p. 810 (1992).

Creaney, S. et al. "Continuous–Fiber Modulator with High–Bandwidth Coplanar Strip Electrodes," *IEEE Photonics Technology Letters*, vol. 8, No. 3, pp. 355–357 (Mar. 1996).

Fawcett, G. et al., "In–Line Fribre–Optic Intesity Modulator Using Electro–Optic Polymer," *Electronic Letters*, vol. 28, No. 11, pp. 985–986 (Mar. 1992).

Field, S. J. et al., "Ion–Implanted Nd:GGG Channel Waveguide Laser," *Optics Letters*, vol. 17, p. 52 (1992).

Helmfrid, S. et al., "Optical Parametric Amplification of a 1.54 $\mu$m Single–Mode DFB Laser in a Ti:LiNbO$_3$ Waveguide," *Journal of Lightwave Technology*, vol. 11, No. 9, pp. 1459–1469 (Sep. 1993).

Izatt, Joseph A. et al., "Optical Coherence Tomography for Biodynamics," pp. 41–65.

Kozlov, V.A. et al. "In–Line Singlemode Fibre Based on LiF:F$_2$–crystals," *Electronic Letters*, vol. 31, No. 24, p. 2104 (Nov. 23, 1995).

Li, Cheng Chung et al., "Er–Doped Glass Ridge–Waveguide Amplifiers Fabricated with a Collimated Sputter Deposition Technique," *IEEE Photonics Technology Letters*, vol. 9, No. 9, pp. 1223–1225 (Sep. 1997).

Marder, Seth R. and Perry, Joseph W., "Nonlinear Optical Polymers: Discovery to Market in 10 Years?" *Science*, vol. 263, pp. 1706–1707 (Mar. 1994).

Marshall, I. W., "Low Loss Coupling Between Semiconductor Lasers and Single–mode Fibre Using Tapered Lensed Fibres," *Br Telecom Technol J*, vol. 4, No. 2, pp. 114–121 (Apr. 2, 1986).

McCallion, K. et al., "Investigation of Optical Fibre Switch Using Electro–Optic Interlays" (Dec. 1991).

Millar, C.A. et al., "Exposed–Core Single–Mode Fiber Channel–Dropping Filter Using a High–Index Overlay Waveguide," *Optical Society of America*, vol. 12, No. 4, pp. 284–286 (Apr. 1987).

Olsson, N. A., "400 Mbit/s, 372 km Coherent Transmission Experiment Using In–line Optical Amplifiers," *Electronic Letters*, vol. 24, No. 1, pp. 36–38 (Jan. 7, 1988).

Panajotov, Krassimir P., "Evanescent Field Coupling Between a Single–Mode Fiber and a Planar Waveguide with Absorption or Gain", *Optical Society of America*, vol. 13, No. 11, pp. 2468–2476 (Nov. 1996).

Rogin, P. and Hulliger, J., "Epitaxial Nd:YLF Lindear Waveguide Laser," *Optic Letters*, vol. 22, p. 1701 (1997).

Sanford, N.A. et al. "Nd:LiTaO$_3$ Waveguide Laser," *Optic Letters*, vol. 17, p. 1578 (1992).

Stewart, Kevin R., "Organic Crystals Give Optoelectronics a Boost," *Photonics Sprectra*, pp. 104–108 (Jul. 1994).

Suto, K. et al., "Semiconductor Raman Laser with Pump Light Wavelength in the 800 nm Region," *1046 Journal of the Electrochemical Society 140*, No. 6, p. 8 (Jun. 1993).

Thyagarajan, K. et al., "Proton–exchanged Periodically Segmented Waveguides in LiNbO$_3$," *Optics Letters*, vol. 19, No. 12, pp. 880–882 (Jun. 15, 1994).

McCallion, K. et al., "Method for Fabricating an Optical Waveguide," pending U.S. Patent Application Serial No. 09/121,455 filed Jul. 23, 1998.

Lawrence, B. et al., "Optical Channel Waveguide Amplifier," pending U.S. Patent Application Serial No. 09/159,012 filed Sep. 23, 1998.

COMPACT OPTICAL AMPLIFIER WITH INTEGRATED OPTICAL WAVEGUIDE AND PUMP SOURCE

CROSS-REFERENCE TO RELATED APPLICATIONS

This Application is a Continuation of U.S. application Ser. No. 09/316,102, filed May 24, 1999, entitled "COMPACT OPTICAL AMPLIFIER WITH INTEGRATED OPTICAL WAVEGUIDE AND PUMP SOURCE," and also relates to the following commonly assigned, previously filed, co-pending U.S. Patent Applications:

1. U.S. patent application Ser. No. 09/121,455, filed Jul. 23, 1998 and entitled "Method for Fabricating an Optical Waveguide;" and
2. U.S. patent application Ser. No. 09/159,012, filed Sep. 23, 1998 and entitled "Optical Channel Waveguide Amplifier."

Each of these previously filed U.S. Patent Applications is hereby incorporated by reference herein in its entirety.

TECHNICAL FIELD

The present invention relates to optical amplifiers, and more particularly to a compact, low cost optical amplifier package having a small optical waveguide amplifier chip and an optical pump integrated therein.

BACKGROUND OF THE INVENTION

The field of optical telecommunications has experienced phenomenal growth over the past several years, fueled in large part by the development and deployment of erbium-doped fiber amplifiers ("EDFAs").

Prior to optical amplifiers, fiber optic communication systems required electronic repeaters to amplify signals and offset the losses associated with long distance optical transmission. These electronic devices converted the transmitted optical signal into the electrical domain, amplified and reshaped the electrical signal, and converted the electrical signal back into an optical signal, and onto the next leg of the fiber system.

Figure 1A:
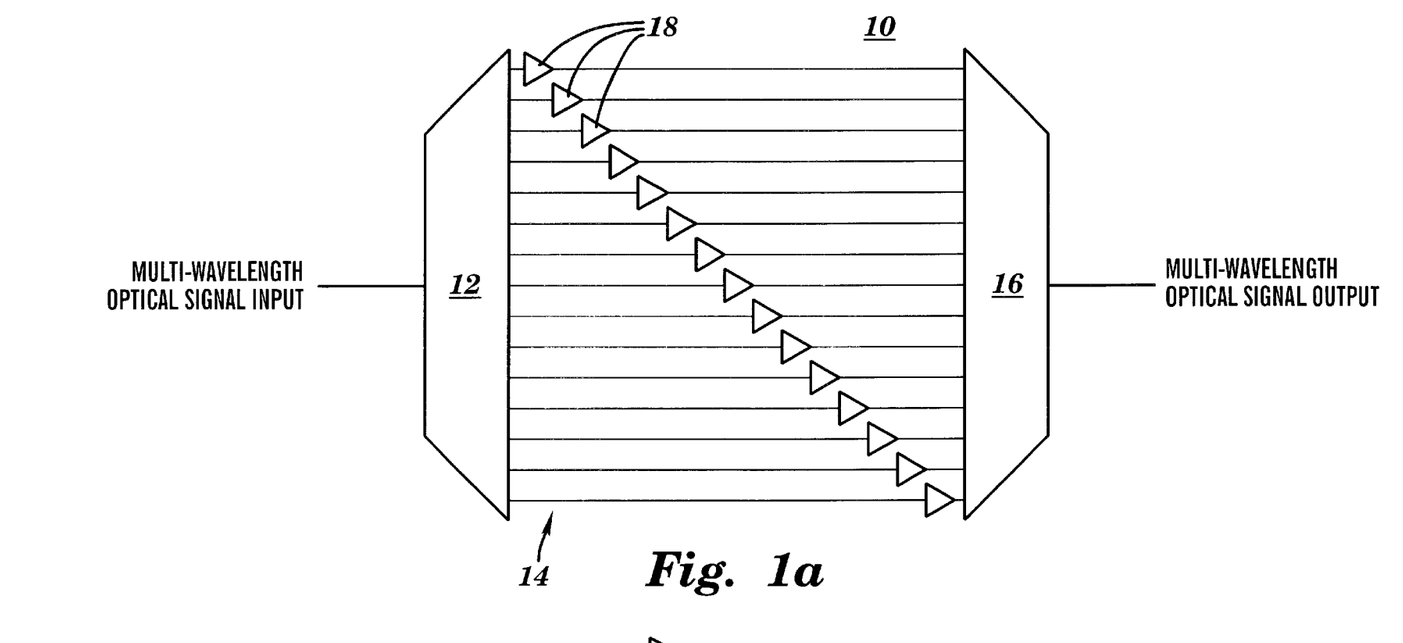
FIG. 1a depicts in schematic form an electrical repeater approach to amplifying a multi-channel optical signal.

Electronic detectors are incapable of discriminating between different wavelengths, therefore, multi-wavelength systems require an independent repeater for each wavelength in the system, as well as the necessary filtering components to isolate each of the wavelengths into their respective repeaters. FIG. 1a is a representative bock diagram of a 16 channel repeater system 10. The large amount of equipment needed made multi-wavelength communications systems using repeaters prohibitively expensive.

Figure 1B:
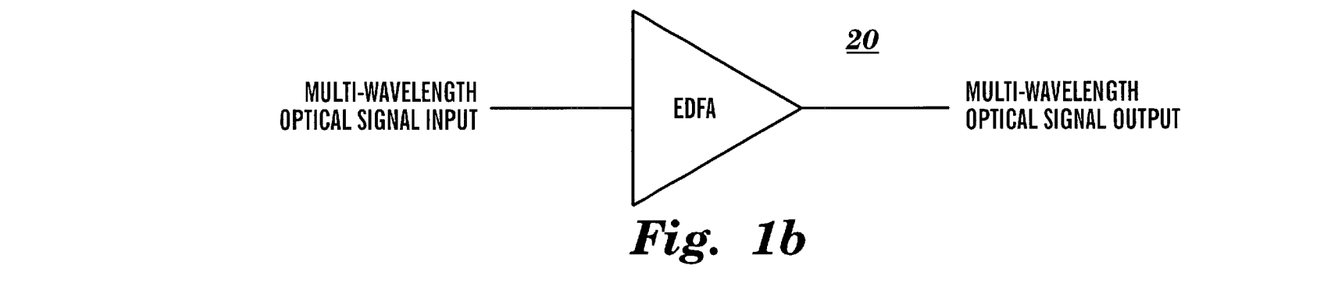
FIG. 1b depicts in schematic form an EDFA approach to amplifying a multi-channel optical signal.

The deployment of the EDFA, however, changed the topology of fiber-optic communication networks. Because the optical amplifier was capable of amplifying multiple wavelengths independently in a single unit, a multi-wavelength system could use a single optical amplifier. The 16 channel repeater system of FIG. 1a requires a wavelength de-multiplexer 12 to break the 16 channels out onto individual fibers 14, 16 repeaters 18, and a wavelength multiplexer 16 to re-combine the 16 individual wavelengths. All of this was replaced by the single EDFA 20 shown in FIG. 1b.

This ability to add multiple channels to a single fiber with minimal additional amplifier costs created an explosion in the bandwidth of optical fiber communication systems. Deployed systems went from single channel sub-gigabit per second operation to 128 channel, multi-gigabit per second per channel operation.

The continuing growth in the bandwidth of optical communication systems has also led to a new demand for more complex functionality in optical networks. To satisfy this demand, manufacturers are desirous of devices in increasingly smaller and more compact packages, while at the same time integrating multiple functions into a single device. In sharp contrast to the ever-shrinking size of many optical network components, the EDFA faces a hard limit because of the fixed value of the minimum bend radius of the fiber. Bend losses are proportional to the bend radius, and hence the radius must be kept large. A nominal radius for such fiber is about 3.75 cm, resulting in a coil diameter of about 7.5 cm (about 3 inches) which in turn results in an minimum package planar dimension of at least 3½×3½ inches. Consequently, though many components such as the isolators, 980/1550 nm multiplexers, and monitor taps and photodiodes can be integrated into the package, the footprint remains constrained by the minimum diameter of the erbium-doped fiber coil. Nominal package dimensions are now about 6×6 inches.

Semiconductor optical amplifiers (SOAs) are also available, and rely on electrical (rather than optical) pump sources for amplification. However, their performance characteristics are known to be deficient in many areas, compared to EDFAs.

The demand for more compact devices with greater integrated functionality is accompanied by the need to reduce the cost of these devices. As optical system designers increase the complexity of their networks, the number of optoelectronic components required grows substantially. For the very same reasons that multi-wavelength systems with electronic repeaters were prohibitively expensive, more complex networks begin to face the same cost issues. Thus, not only is "real estate" within the system at a premium requiring smaller, integrated devices, but cost also plays a significant role requiring less expensive components as well.

The EDFA was the critical enabling technology that gave rise to the recent boom in optical communications known as WDM. As communications systems continue to grow and expand, system designers find themselves in need of new devices, amplifiers in particular, that are smaller and less expensive than their current counterparts. A compact, low cost optical amplifier with the ability to incorporate additional devices for added functionality is therefore required.

SUMMARY OF THE INVENTION

The shortcomings of the prior approaches are overcome, and additional advantages are provided, by the present invention which in one aspect is an optical amplifier having a housing with optical signal input and output ports; a channel waveguide chip in said housing for optically amplifying an input optical signal from the input port using an optical pump signal applied thereto; and an optical pump source in the housing for generating the optical pump signal.

The amplifier may also include input coupling optics for transmitting the input optical signal into the channel waveguide chip from the input port; and output coupling optics for carrying an output optical signal from the channel waveguide chip to the output port.

In one embodiment, the channel waveguide chip includes a linear core having an input end for receiving an input optical signal, and an output end for producing an output optical signal; and a surface through which the optical pump signal is received. The surface of the channel waveguide chip may be arranged at an approximately 45 degree angle with the linear core thereof. The optical pump source transmits the optical pump signal at approximately a 90 degree angle with the core. The chip may also include a reflective coating applied over the surface to reflect the optical pump signal into the linear core. A prism may be applied over the surface for directing the input optical signal colinearly into the core.

The optical pump source may be a laser diode which generates the optical pump signal internal to the housing, wherein the only optical ports of the amplifier are the optical signal input and output ports.

Based on the types of components used, the present invention attains a package dimension of less than about 3 inches in at least one planar dimension.

The amplifier disclosed herein provides, in a compact, cost-effective package, a channel waveguide amplifier chip, appropriate optics to couple the signal into and out of the waveguide, a pump laser diode, and appropriate optics to focus the light from the pump laser diode into the waveguide. In addition, the amplifier may also be constructed to integrate additional optical components for added functionality. This invention therefore provides significant optical amplification in a low-cost, compact package that can minimize the space required within a communications system to provide signal amplification, and be integrated with additional components, such as splitters, wavelength multiplexers or demultiplexers, or optical add/drop multiplexers.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

DETAILED DESCRIPTION OF THE PREFERRED EMBODIMENT(S)

Figure 2A:
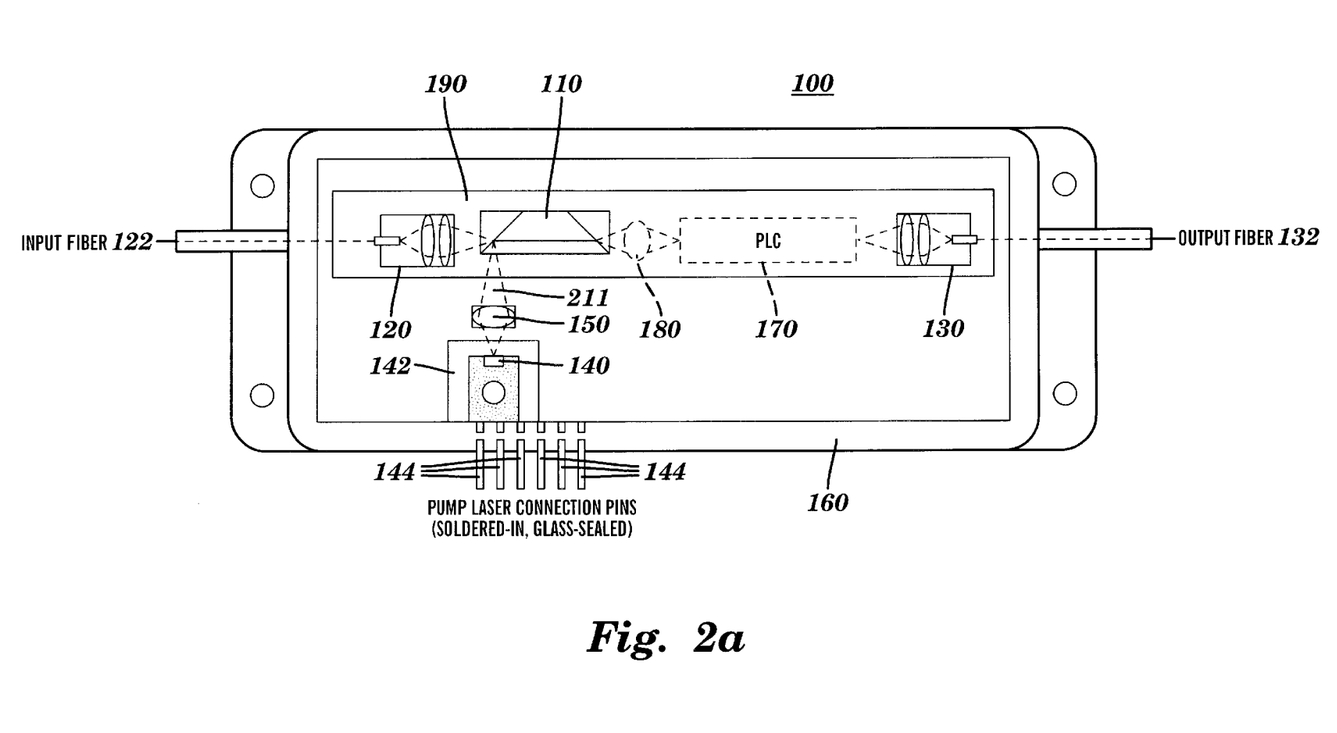
FIG. 2a is a top plan view of an optical amplifier in accordance with the present invention, partially in schematic form and with the cover of the housing removed.
Figure 2B:
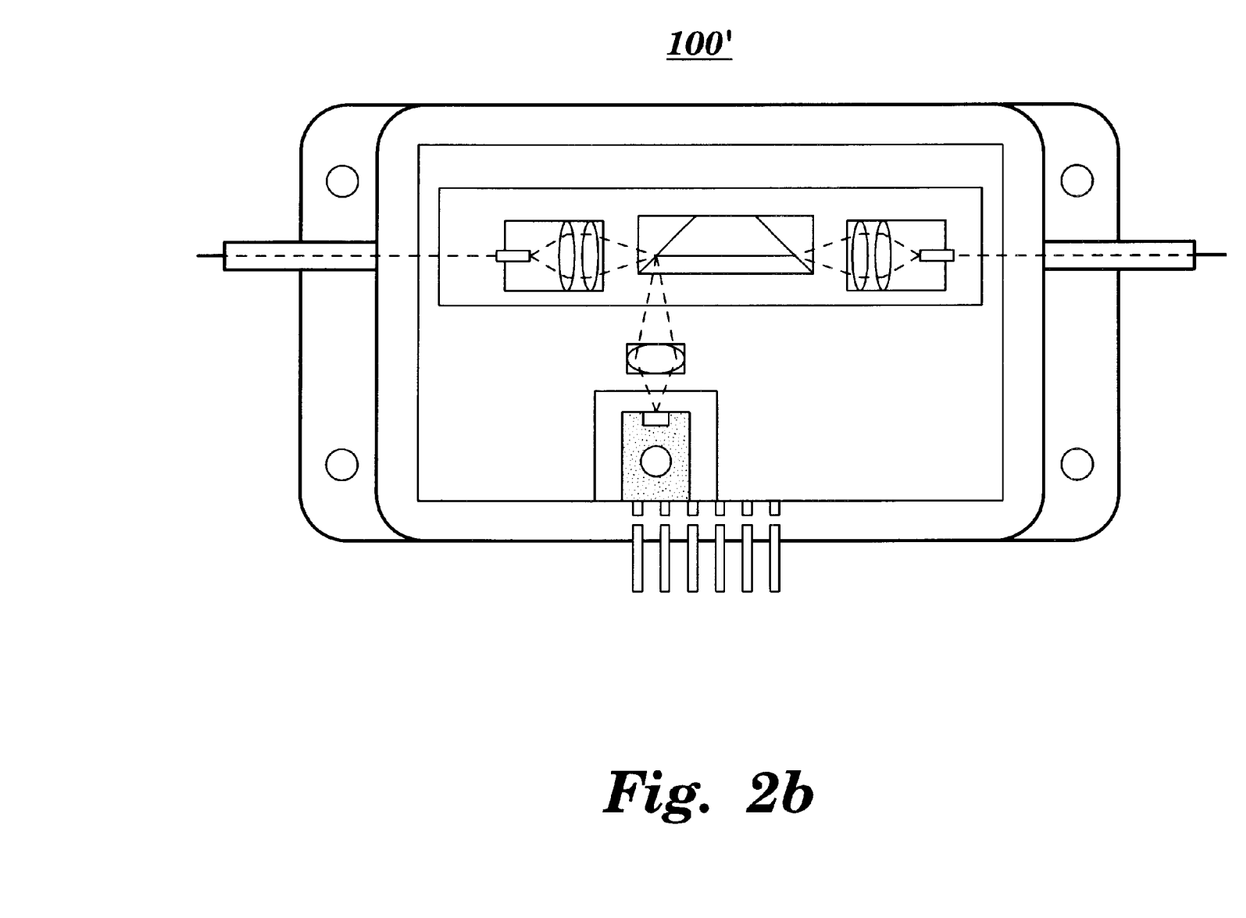
FIG. 2b is a top plan view of another embodiment of an optical amplifier in accordance with the present invention, partially in schematic form and with the cover of the housing removed.

With reference to FIGS. 2a–b, compact waveguide amplifiers 100 and 100' in accordance with the present invention include a channel waveguide amplifier chip 10, signal input coupling optics 120 (to couple the optical input signal from input fiber 122), signal output coupling optics 130 (to couple the optical output signal to output fiber 132), a pump laser 140, and pump coupling optics 150 (to couple the optical pump signal between pump laser 140 and chip 110). Certain components may be aligned on alignment bench 190.

Optional components such as planar lightwave circuit 170 and its associated coupling lens 180 can also be easily integrated into amplifier 100 of FIG. 2a, but are omitted from the smaller version thereof 100' of FIG. 2b.

The compact size of the housing 160 (e.g., nickel/gold plated) results from the small waveguide chip 110, coupled with the ability to use an integrated diode pump 140, discussed further below.

Figure 3:
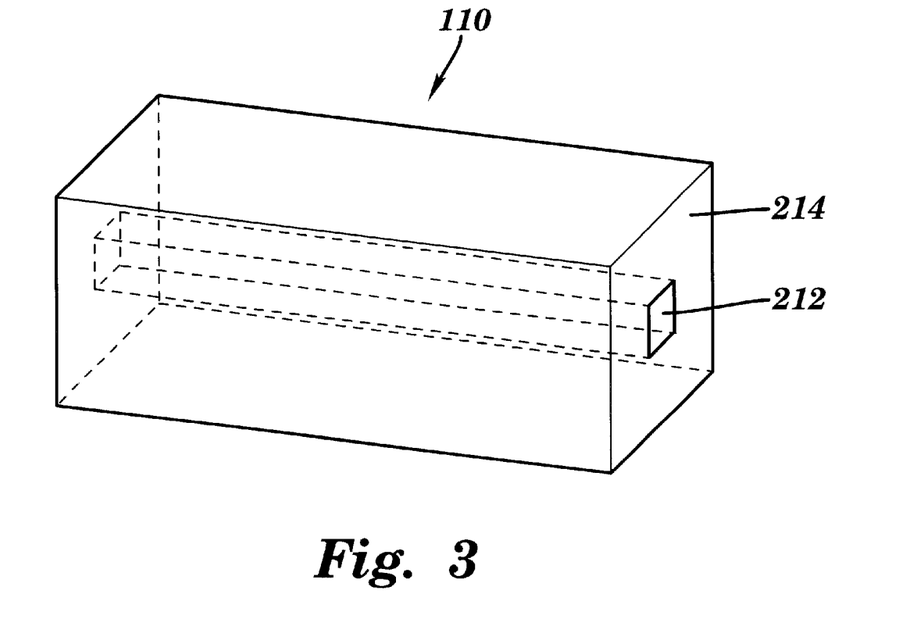
FIG. 3 is a perspective view of a channel waveguide amplification chip employed in the amplifiers of FIGS. 2a–b, in accordance with the present invention.
Figure 4:
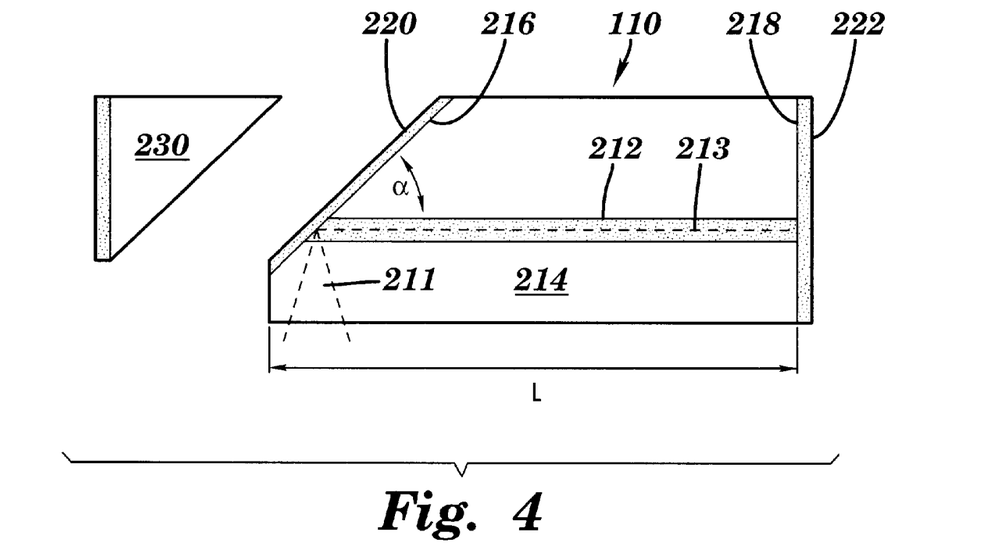
FIG. 4 is a front sectional view of an alternate embodiment of the channel waveguide chip of FIG. 3.

Exemplary channel waveguide chip 110, shown in detail in FIGS. 3–4, may be of the type disclosed in the above-incorporated U.S. patent application Ser. No. 09/159,012 entitled "Optical Channel Waveguide Amplifier," and may be fabricated using the procedures disclosed in the above-incorporated U.S. patent application Ser. No. 09/121,455 entitled "Method for Fabricating an Optical Waveguide".

This optical waveguide 110 includes a core 212 of active material surrounded by a cladding 214 comprising, for example, a dissimilar material than the core. As used herein, the phrase "dissimilar material" means that the material comprising the cladding and the material comprising the core are structurally and/or chemically distinct having been separately fabricated as physically different materials and brought together during the assembly process for the optical waveguide 110.

Briefly summarized, in one embodiment fabrication of optical waveguide 110 is a multi-step process using precision lapping and polishing techniques to mechanically thin the selected optical material (i.e., core) to the desired thickness in both the lateral and vertical directions. Optical adhesives are used to bond the channel waveguide to the surrounding support/cladding media. The fabrication process may include preparing a flat, optical surface on both the chosen optical material (i.e., core) and the chosen support substrate (i.e., cladding). Fused silica may be used as a support substrate due to its ease of processing and low refractive index. In the case of very thin glue layers (<1 $\mu$m), for efficient waveguiding action, the channel must be surrounded by a lower refractive index material. Obviously, the refractive index of the selected optical material (core) determines the index range for the cladding or support regions. Other requirements of the surrounding medium are processing compatibility with the optical material, availability of the material, and adhesive bonding affinity. Fused silica meets these requirements, although a range of optical glasses are also ideal. The waveguide chip 110 may be composed of a linear core 212 doped with an active ion such as Nd:YAG, Er:glass, or Nd:glass, among others. The compact nature of the waveguide is enabled by the use of high-gain materials. Of particular applicability is the family of Erbium/Ytterbium(Er/Yb) co-doped phosphate glasses which have nearly 100 times the number density of atoms, do not suffer quenching effects, and have twice the emission cross-section relative to their silica counterparts typically used in EDFAs. The core 212 may be nominally square in cross-section and of size from 10 $\mu$m to 30 $\mu$m on a side. The surrounding cladding 214 may be an undoped material of lower refractive index. One end of the waveguide chip 216 may be polished at an angle ($\alpha$) of 45 degrees with respect to the waveguide axis. The angle-polished end is then coated 220 to reflect the applied pump signal 211, and overlaid with a prism 230 matched in index to the core (and bonded to the waveguide with an ultraviolet(UV)-cured optical adhesive) for directing the input optical signal colinearly into the core as signal 213.

The opposing end of the waveguide may be prepared in one of two ways. The first design (shown in FIG. 4) utilizes a perpendicular end-face 218 with an anti-reflection (AR) coating 222 to minimize back-reflections. If, however, the AR coating is insufficient, the second design option (shown in FIGS. 2*a*–*b*) involves polishing the opposing end at 45 degrees and bonding an index-matched right-angle prism with UV-cured adhesive to further mitigate reflections.

Channel waveguide chip 110 in one embodiment is about 10–30 mm in length (L), and the overall planar dimensions of the amplifier housing of amplifier 100' (i.e., the length and width of the view of FIG. 2*b* without the optional PLC 170 and coupling lens 180 of amplifier 100 of FIG. 2*a*), can therefore be about 1½ inches×about 2½ inches. (The package thickness is about ¾ inch.) This smaller, overall planar dimension stands in contrast to that of a functionally equivalent EDFA amplifier of 6×6 inches, at the 1530–1565 nm bandwidth of interest, and in fact is even better than the absolute, theoretically planar dimensions of EDFAs discussed above of 3×3 inches, based on the minimum bend radius. The present invention therefore provides at least one (and in fact both) planar dimensions of less than about 3 inches. Waveguide chip 110 of amplifiers 100 and 100' provides high gain in a relatively short device (when compared to the several meters of erbium-doped fiber typical in EDFAs), and therefore results in a smaller size of the amplifier housings.

Waveguide 110 requires a pump source to provide a source of the optical pump signal 211 for waveguide gain. With reference to FIG. 2*a*, exemplary pump source 140 disclosed herein is a single or multi-mode laser diode on a submount and maintained at constant temperature with a thermo-electric cooler (TEC) 142. One exemplary diode is an Open Heat Sink Packaged Laser Diode available from High Power Devices, Inc., model number HPD1005C. Power is provided to both the laser diode and the TEC through external pins 144. Additional pins may also be included to incorporate a monitor photodiode to monitor pump laser power, a thermistor to monitor pump laser temperature, and gain monitoring sensors (not shown). To couple the signal 211 from the pump laser diode into the waveguide 110, lenses 150 are used to focus the power into the waveguide off of the 45-degree coated end-face of the waveguide. The pump source may therefore be arranged to transmit the optical pump signal at an angle of 90 degrees relative the longitudinal axis of the waveguide. Notably, the optical pump signal is generated internal to the amplifier housing, and no additional optical input ports are required for the pump signal. This feature adds to the cost and space savings provided by the amplifier disclosed herein.

Amplifiers 100 and 100' also include the optics used to couple the optical signal into and out of the waveguide 110. The input side of the waveguide is typically buried behind a prism 230 (FIG. 4) and thus requires a set of optics 120 to image the single-mode fiber 122 output into the waveguide chip 110. At a minimum, a low numerical aperture (NA) matched pair of lenses may be used to image the fiber output with a 1:1 magnification ratio into the waveguide. Other options include lenses that can expand the beam to fill the waveguide core. In any case, the goal of the input optics is to couple the signal light from the input fiber 122 into the waveguide with as little loss as possible. For core dimensions larger than approximately 10 μm on a side, 1:1 imaging lenses work very well.

Coupling optics 130 recover the signal from the waveguide and return it to the optical fiber 132. For waveguides not much larger than 10–15 μm on a side, 1:1 imaging lenses can effect coupling with as little as 2–3 dB of total coupling loss. To reduce the coupling losses further may require lenses that provide image reduction. Similarly, for larger waveguides some form of imaging reduction may also be necessary.

The compact nature of the amplifier disclosed herein facilitates integration of additional components therein. For example, as shown in FIG. 2*a*, an optional planar lightwave circuit (PLC) 170 may, for example, be a silica waveguide splitter (e.g., Gould Fiber Optics, model number 47-10335-18-05631) or an arrayed waveguide grating (AWG) multiplexer (e.g., Photonic Integration Research, Inc., model number AWG-WB-1×8-200G-1.5-M-FC). Each of these devices, because of its performance in a filter capacity, has high insertion loss associated therewith. However, when integrated with the compact, low-cost amplifier discussed above in a small package, the intrinsic losses are offset to create so-called "lossless" versions. Many benefits result from a small, inexpensive amplifier integrated with one, or even several, additional optoelectronic components, such as PLC 170.

The amplifiers discussed herein, based on a channel waveguide chip, provide compact, low cost optical solutions for use in fiber optic systems. Their primary application is optical amplification in communication systems where space is at a premium, and smaller devices are required. In addition, these amplifiers are ideal for use in systems where the design requires large numbers of low-cost devices to achieve the desired performance. Finally, because of their compact nature, the amplifiers can be integrated with other devices such as splitters or multiplexers and de-multiplexers. When adding additional components into the package, the insertion loss associated with the components can be offset by the optical amplification, allowing for the development of "lossless" versions of these very same optical components.

While the invention has been particularly shown and described with reference to preferred embodiment(s) thereof, it will be understood by those skilled in the art that various changes in form and details may be made therein without departing from the spirit and scope of the invention.

What is claimed is:

1. An optical amplifier, comprising:
    a housing having optical signal input and output ports;
    a channel waveguide chip in said housing for optically amplifying an input optical signal from said input port using an optical pump signal applied thereto; and
    an optical pump source in said housing for generating the optical pump signal.

2. The optical amplifier of claim 1, wherein the channel waveguide chip comprises:
    a linear, amplifying core having an input end for receiving the input optical signal, and an output end for producing an amplified, output optical signal; and
    a surface through which the optical pump signal is received.

3. The optical amplifier of claim 1, wherein the optical pump source is a laser diode which generates the optical pump signal internal to the housing, and wherein the only optical ports to or from the amplifier housing are the optical signal input and output ports.

4. The optical amplifier of claim 1, wherein the housing has at least one planar dimension less than about 3 inches.

5. The optical amplifier of claim 1, further comprising:
    an additional optical component in the housing in cooperative operation with the channel waveguide chip.

6. A method for optically amplifying an input optical signal applied to an amplifier housing, the method comprising:

generating an optical pump signal in the housing;

applying the optical pump signal to a channel waveguide chip in the housing to facilitate amplification of the input optical signal into an amplified, output optical signal.

7. The method of claim 6, wherein said generating includes using a laser diode in said housing.

8. The method of claim 6, further comprising coupling as optical signals to the housing only the input optical signal and the output optical signal.

9. The method of claim 6, wherein the channel waveguide chip comprises:

a linear, amplifying core having an input end for receiving the input optical signal, and an output end for producing an amplified, output optical signal; and a surface through which the optical pump signal is received.

10. A method for fabricating an optical amplifier, comprising:

providing a housing having optical signal input and output ports;

positioning a channel waveguide chip in said housing for optically amplifying an input optical signal from said input port using an optical pump signal applied thereto; and positioning an optical pump source in said housing for generating the optical pump signal.

11. The method of claim 10, wherein the channel waveguide chip comprises:

a linear, amplifying core having an input end for receiving the input optical signal, and an output end for producing an amplified output optical signal; and a surface through which the optical pump signal is received.

12. The method claim 10, wherein the optical pump source is a laser diode which generates the optical pump signal internal to the housing, and wherein the only optical ports to or from the amplifier housing are the optical signal input and output ports.

13. The method of claim 10, wherein the housing has at least one planar dimension less than about 3 inches.

14. The method of claim 10, further comprising:

providing an additional optical component in the housing for cooperative operation with the channel waveguide chip.

15. The optical amplifier of claim 2, wherein the optical pump signal and the input optical signal are together combined into the linear core at said surface.

16. The optical amplifier of claim 1, wherein the channel waveguide chip comprises:

a linear, amplifying core having an input end for receiving the input optical signal and the optical pump signal, and an output end for producing an amplified, output optical signal;

a region proximate said input end of said linear, amplifying core in which the input optical signal and the optical pump signal are combined.

17. The optical amplifier of claim 1, wherein the optical pump signal is focused from the optical pump source into the channel waveguide chip.

18. The optical amplifier of claim 1, wherein the input optical signal is single mode and the pump signal is multi-mode.

19. The optical amplifier of claim 1, further comprising:

a pump source temperature controller in the housing; and a pump source temperature monitor in the housing.

20. The optical amplifier of claim 19, further comprising:

a pump source power monitor in the housing.

21. The optical amplifier of claim 20, further comprising:

pins emanating from the housing for the pump source temperature controller, the pump source temperature monitor, and the pump source power monitor.

22. The optical amplifier of claim 21, wherein the input optical signal is single mode and the pump signal is multi-mode, wherein the only optical ports to or from the housing are the optical signal input and output ports, and wherein the housing has at least one planar dimension less than about three inches.

23. The optical amplifier of claim 1, wherein said channel waveguide chip comprises a linear core with distal input and output ends, formed of a first material and a surrounding cladding formed of a second material, wherein said first material and said second material are structurally and/or chemically distinct having been separately fabricated as physically different materials and brought together during waveguide assembly.

24. The optical amplifier of claim 23, wherein said first and second material are adhesively attached in said channel waveguide chip.

25. The optical amplifier of claim 18, further comprising:

input coupling optics for carrying the input optical signal toward the channel waveguide chip from the input port;

output coupling optics for carrying an amplified output optical signal from the channel waveguide chip toward the output port; and lenses for focusing the optical pump signal from the optical pump source into the channel waveguide chip.

26. The optical amplifier of claim 15, wherein the surface of the waveguide amplification chip is arranged at an approximately 45 degree angle with the linear core thereof, the optical pump source transmits the optical pump signal at approximately a 90 degree angle with the core, the channel waveguide chip further comprising:

a reflective coating applied over the surface to reflect and thereby combine the optical pump signal into the linear core with the input optical signal.

27. The optical amplifier of claim 26, wherein the channel waveguide chip further comprises:

a prism applied over the surface for directing the input optical signal colinearly into the linear core.

28. The method of claim 9, further comprising:

combining the optical pump signal and the input optical signal together into the linear core at said surface.

29. The method of claim 6, wherein the channel waveguide chip comprises a linear, amplifying core having an input end for receiving the input optical signal and the optical pump signal, and an output end for producing the amplified, output optical signal, the method further comprising:

combining the input optical signal and the optical pump signal in a region proximate said input end of said linear, amplifying core.

30. The method of claim 6, further comprising:

focusing the optical pump signal from an optical pump source into the channel waveguide chip.

31. The method of claim 6, wherein the input optical signal is single mode and the pump signal is multi-mode.

32. The method of claim 31, further comprising:

coupling, using input coupling optics, the input optical signal from an input port toward the channel waveguide chip;

coupling, using output coupling optics, the amplified, output optical signal from the channel waveguide chip toward an output port; and focusing the optical pump signal from the optical pump source into the channel waveguide chip.

33. The method of claim 28, wherein the surface of the channel waveguide chip is arranged at an approximately 45 degree angle with the linear core thereof, the optical pump source transmits the optical pump signal at approximately a 90 degree angle with the core, the channel waveguide chip further comprising:

a reflective coating applied over the surface to reflect and thereby combine the optical pump signal into the linear core with the input optical signal.

34. The method of claim 33, wherein the channel waveguide chip further comprises:

a prism applied over the surface for directing the input optical signal colinearly into the linear core.

35. The method of claim 6, further comprising:

controlling pump source temperature using a temperature controller in the housing; and monitoring pump source temperature using a temperature monitor in the housing.

36. The method of claim 35, further comprising:

monitoring pump source power using a power monitor in the housing.

37. The method of claim 36, further comprising:

wherein said controlling and both monitoring steps include using pins emanating from the housing for the temperature controller, the temperature monitor, and the power monitor.

38. The method of claim 37, wherein the input optical signal is single mode and the optical pump signal is multi-mode, wherein the only optical ports to or from the housing are ports for the input optical signal and the amplified, output optical signal, and wherein the housing has at least one planar dimension less than about three inches.

39. The method of claim 6, wherein said channel waveguide chip comprises a linear core with distal input and output ends, formed of a first material and a surrounding cladding formed of a second material, wherein said first material and said second material are structurally and/or chemically distinct having been separately fabricated as physically different materials and brought together during waveguide assembly.

40. The method of claim 39, wherein said first and second material are adhesively attached in said channel waveguide chip.

41. The method of claim 11, wherein the optical pump signal and the input optical signal are together combined into the linear core at said surface.

42. The method of claim 10, wherein the channel waveguide chip comprises:

a linear, amplifying core having an input end for receiving the input optical signal and the optical pump signal, and an output end for producing an amplified, output optical signal; and a region proximate said input end of said linear, amplifying core in which the input optical signal and the optical pump signal are combined.

43. The method of claim 10, further comprising:

positioning the optical pump source in the housing such that the optical pump signal is focused into the channel waveguide chip.

44. The method of claim 10, wherein the input optical signal is single mode and the pump signal is multi-mode.

45. The method of claim 44, further comprising:

providing input coupling optics for carrying the input optical signal toward the channel waveguide chip from the input port;

providing output coupling optics for carrying an output optical signal from the channel waveguide chip toward the output port; and providing lenses for focusing the optical pump signal from the optical pump source into the channel waveguide chip.

46. The method of claim 41, wherein the surface of the waveguide amplification chip is arranged at an approximately 45 degree angle with the linear core thereof, the optical pump source transmits the optical pump signal at approximately a 90 degree angle with the core, the channel waveguide chip further comprising:

a reflective coating applied over the surface to reflect and thereby combine the optical pump signal into the linear core with the input optical signal.

47. The method of claim 46, wherein the channel waveguide chip further comprises:

a prism applied over the surface for directing the input optical signal colinearly into the linear core.

48. The method of claim 10, further comprising:

providing a pump source temperature controller in the housing; and providing a pump source temperature monitor in the housing.

49. The method of claim 48, further comprising:

providing a pump source power monitor in the housing.

50. The method of claim 49, further comprising:

providing pins emanating from the housing for the pump source temperature controller, the pump source temperature monitor, and the pump source power monitor.

51. The method of claim 50, wherein the input optical signal is single mode and the pump signal is multi-mode, wherein the only optical ports to or from the housing are the optical signal input and output ports, and wherein the housing has at least one planar dimension less than about three inches.

52. The method of claim 10, wherein said channel waveguide chip comprises a linear core with distal input and output ends, formed of a first material and a surrounding cladding formed of a second material, wherein said first material and said second material are structurally and/or chemically distinct having been separately fabricated as physically different materials and brought together during waveguide assembly.

53. The method of claim 52, further comprising:

adhesively attaching said first and said second materials in said waveguide.

* * * * *